United States Patent
Gandhi et al.

(10) Patent No.: US 10,146,805 B2
(45) Date of Patent: *Dec. 4, 2018

(54) METHOD AND APPARATUS FOR DATABASE SANITIZING

(71) Applicant: EMC IP Holding Company LLC, Hopkinton, MA (US)

(72) Inventors: Rajesh Kumar Gandhi, Shrewsbury, MA (US); Venkata Ramana Rao Tiruveedi, Franklin, MA (US); Hanumantha Reddy Narayana, Bangalore (IN); Pushpalatha Tantrady, Tamil Nadu (IN); Arun Kumar Palani, Bangalore (IN); Anuragh Ravindran, Bangalore (IN); Anitha Athipathy, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/246,427

(22) Filed: Apr. 7, 2014

(65) Prior Publication Data

US 2014/0337988 A1    Nov. 13, 2014

Related U.S. Application Data

(63) Continuation of application No. 12/257,710, filed on Oct. 24, 2008, now Pat. No. 8,719,233.

(51) Int. Cl.
G06F 17/30    (2006.01)
G06F 21/62    (2013.01)

(52) U.S. Cl.
CPC .... *G06F 17/30289* (2013.01); *G06F 21/6254* (2013.01); *G06F 2221/2143* (2013.01)

(58) Field of Classification Search
None
See application file for complete search history.

(56) References Cited

U.S. PATENT DOCUMENTS

| | | | |
|---|---|---|---|
| 7,809,764 B2 * | 10/2010 | Mak | 707/802 |
| 2006/0080554 A1 * | 4/2006 | McDonald et al. | 713/189 |
| 2007/0274154 A1 * | 11/2007 | Simon et al. | 367/38 |
| 2008/0301076 A1 * | 12/2008 | Timmins et al. | 706/46 |

* cited by examiner

*Primary Examiner* — Christopher J Raab
(74) *Attorney, Agent, or Firm* — Krishnendu Gupta

(57) ABSTRACT

A method of generating a test database from a deployed database by "sanitizing", or removing sensitive data, is employed for recreating problem scenarios from a customer site, verifying compatibility of customer data with database version updates, and for performance testing using actual, rather than generated, database structures. In database management operations, in can be beneficial to use data generated from actual operational scenarios rather than artificially generated data created from a test pattern. Data generated from actual operation, such has at a customer site, assures compatibility with the relation patterns and record volumes employed by the customer (user). However, databases often contain sensitive information that would be inappropriate, illegal, or vulnerable in a testing environment. Accordingly, the generated test database overwrites sensitive data values with benign, or generic values while preserving the structure and relations of the data stored.

15 Claims, 8 Drawing Sheets

| TNAME | CNAME | PREFIX | ORDEROFEXE | FUNCTIONALITY |
|---|---|---|---|---|
| Adapter | Adpatername | Adpatername | 1 | update |
| Adapter | Aliasname | Adapteraliasname | 2 | update |
| Portwwn | wwnnickname | portwwnname | 3 | update |
| Reservation | | | 4 | truncate |
| Fibredevice | managementurl | Fibredeviveurl | 5 | update |
| Fibredevice | ipaddress | Fibredevivelpaddress | 6 | update |
| Alertrawparsed | | | 7 | truncate |
| Definedpolicy | name | definedpolicyname | 8 | update |
| Definedpolicy | name | definedpolicyDisplayname | 9 | update |
| AllowedUDFValue | udfvalue | allowedudfvalue | 10 | update |

*Fig. 4*

METHOD AND APPARATUS FOR DATABASE SANITIZING

CROSS REFERENCE TO RELATED APPLICATIONS

This application is a Continuation of U.S. patent application Ser. No. 12/257,710 entitled "METHOD AND APPARATUS FOR DATABASE SANITIZING" filed on Oct. 24, 2008, now U.S. Pat. No. TBD issued on TB, which claims the benefit of India Patent Application Serial No. 1534/CHE/2008 filed on Jun. 24, 2008 entitled "GENERIC DATABASE SANITIZER," the teachings of which applications are hereby incorporated herein by reference in their entirety.

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Modern trends in information processing are continually storing increasing quantities of sensitive data in electronic form. With the increase in sensitive, confidential and/or personal data stored in databases adapted for remote access, the risk of intrusion to such databases presents more serious concerns. As more and more enterprises employ electronic transfer of information in lieu of more traditional paper means, however, ability to conduct electronic transactions becomes more crucial to business viability. Increased media attention to breaches of commercial databases containing sensitive information has heightened public awareness of vulnerabilities of electronic storage of such sensitive information. The result is that holders of sensitive information recognize a need to safeguard sensitive information entrusted to them, and to guard against inadvertent dissemination of sensitive information stored in computer databases under their control.

In an information processing environment, therefore, there is a need to avoid inappropriate and/or inadvertent dissemination of sensitive information. However, the databases storing this information are subject to operational and maintenance activities that may inadvertently or unintentionally expose the data stored thereby. Databases are prone to defragmentation, software updates, structural and format changes, and other activities that directly manipulate database contents, and that may require transfer of the database contents to a third party.

SUMMARY

In an information processing environment, databases often contain sensitive information, which may include confidential, sensitive, personal, or other private information of business associates such as customer, clients, vendors and others. In a database management system, it is sometimes necessary or beneficial to perform testing or interrogation of database entities. Such database management systems may undergo intrusive activities related to occurrences such as software revisions, troubleshooting operations, and performance evaluation. These intrusive activities are often more effective if employed with the actual data patterns from the database. However, the actual data often contains sensitive data that is inappropriate for use in a testing environment. For example, testing may be performed in another country where the sensitive data would be subject to different privacy laws, or the data may be observable by test operators to whom dissemination of the data would be inappropriate.

However, modern database management systems that maintain the data in such databases are often complex arrangements of tables, fields and indexes. Conventional identification and overwriting of the sensitive data involves manual identification of the data and resulting patterns of relations to other database entities. Testing using the database may be performed for a variety of reasons, such as version upgrades, export, performance and scalability testing. Test databases may include either actual or generated entries for testing the database and applications that access it.

In each of these scenarios, it is beneficial to employ actual data patterns generated from processing the actual data, rather than attempting to emulate data records via a test generation tool. Such synthetically generated databases may not accurately define the complex patterns of relations between database objects, and/or require substantial manual intervention to define.

Conventional methodologies suffer from the shortcoming that there is no efficient way to effectively purge sensitive information from the database tables without disrupting the structure and relations of the data stored thereby. Such conventional approaches suffer from the shortcoming that lengthy and time consuming manual updates need be performed on fields of sensitive information, and are particularly unwieldy when a large database having many entries is required. Alternatively, synthetically generated "test" databases result in a scenario that does not replicate the original configuration of data objects that the testing is directed, and thus may fail to emulate certain scenarios from the "real world" database.

Accordingly, configurations herein substantially overcome the shortcomings presented by conventional manual approaches by providing a generic method for eliminating sensitive or private information from databases while maintaining data integrity. Those skilled in the art may refer to the removal of sensitive information as "scrubbing" the database or data stream. Disclosed configurations include a method and implementation of a mechanism to remove sensitive data such as customer-specific information from an exported database dump, and substitute it with generic data while maintaining full data integrity and consistency. This enables usage of the database for research and development and at the same time ensures privacy of the customer data. Sensitive data values are replaced using benign values correlated to a mapping of relations to maintain the same relations with benign "scrubbed" key fields. The replaced fields are enumerated in a listing of tables and columns applicable in a generic manner to any suitable database by identifying the affected tables and columns.

Configurations include a method of generating a test database from a deployed database for recreating problem scenarios from a customer site, verifying compatibility of customer data with database version updates, and performance testing using actual, rather than generated, database structures. In database management operations, in can often be beneficial to use data generated from actual operational scenarios rather than artificially generated data created from a test pattern. Data generated from actual operation, such has at a customer site, assures compatibility with the relation patterns and record volumes employed by the customer (user). However, databases often contain sensitive information that would be inappropriate, illegal, or vulnerable in a testing environment. Accordingly, the generated test database overwrites sensitive data values with benign, or generic values while preserving the structure and relations of the data stored. The generated test database is therefore "scrubbed" to allow scenarios based on the actual structure of the database without compromising sensitive data values.

Certain testing and maintenance activities require customer database dumps for troubleshooting and reproducing issues in our development and testing labs. Scrubbed or sanitized customer databases are also useful to perform regression, scalability and performance tests. These customer databases are not only used by software development teams but also the related product teams for corresponding integrated products. While certain contexts permit the use of customer databases for troubleshooting and resolving customer issues, in other circumstances it is not proper to retain these databases for research and development by all these product teams due to legal reasons. This issue becomes even more acute when software development activities are outsourced to a foreign vendor such that the databases are to be shared with the vendor. There are no known tools available to remove the customer sensitive information in a satisfactory manner as describe above. Other options are to allocate few resources to manually inspect the data in various tables and update the customer specific information with generic ones, however, this approach is time consuming and resource intensive with a large installed customer base.

Alternate configurations of the invention include a multiprogramming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable storage medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 4 is a scrubbing configuration table employed for generating scripts for performing processing according to FIG. 3.

DETAILED DESCRIPTION

The disclosed database sanitizing approach is illustrated on a configuration database of a storage area network, however the disclosed generic approach may be applied to any suitable database having tables of column-based entries, as discussed below. In the example arrangement shown, a sanitizing application operates as a database tool responsive to a user request and executed in conjunction with a database management system (DBMS) for executing a script generated by the tool. The tool employs metadata in the form of a scrubbing configuration, discussed further below, to store the tables and columns that could potentially have customer sensitive data. This tool automatically scans all the tables and columns from the metadata and generates all the necessary update scripts on demand for the given customer database. The tool executes these dynamically generated scripts and substitutes the customer sensitive data with generated benign data. This tool also keeps exception and success logs such that invalid records can be re-processed after fixing the issues. The tool thus ensures that integrity of the data is maintained by replacing sensitive field with benign information while leaving relations and keys undisturbed.

Figure 1:
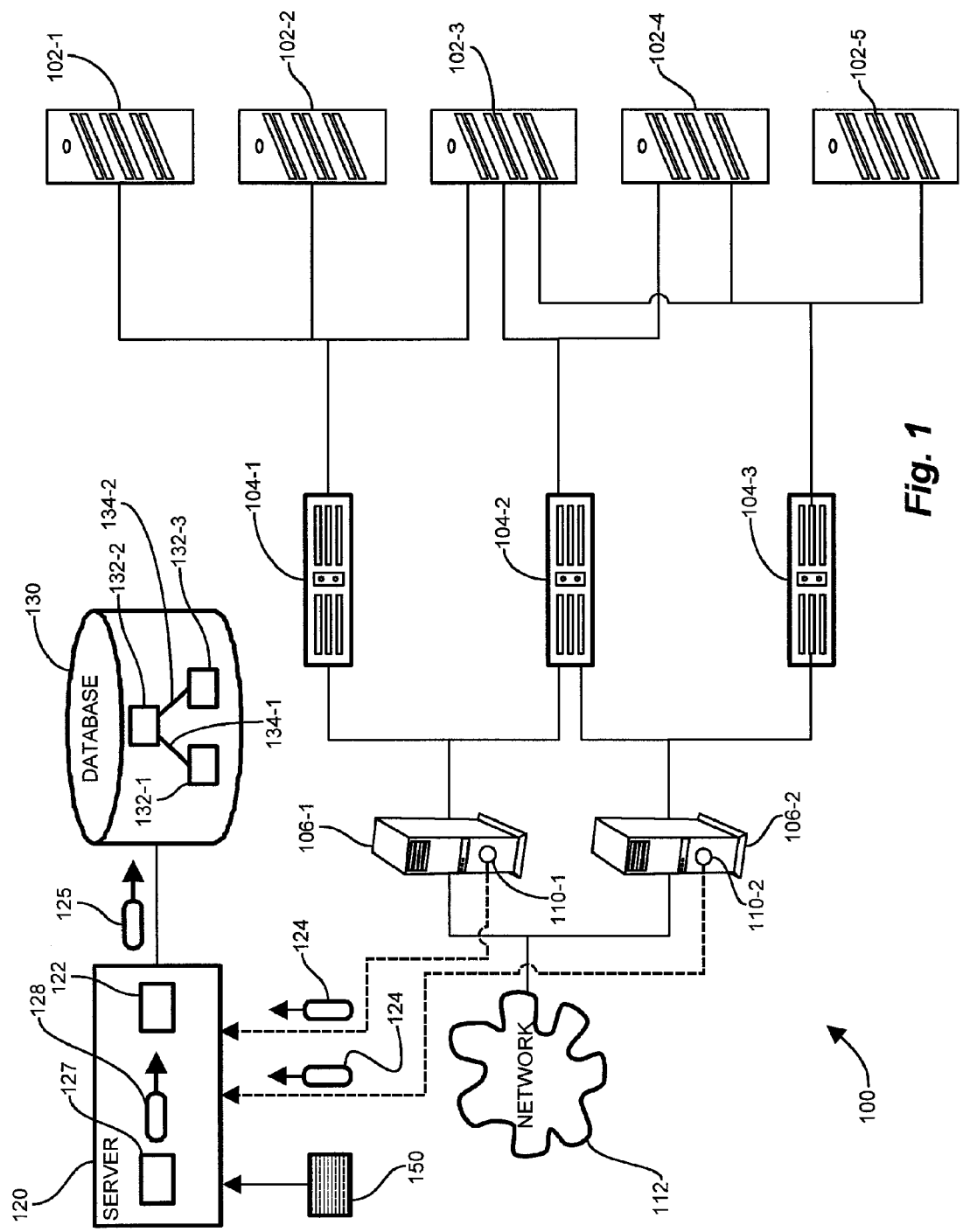
FIG. 1 is a context diagram of a managed information environment suitable for use with the present invention.

FIG. 1 is a context diagram of a managed information environment suitable for use with the present invention. Referring to FIG. 1, in a managed information system such as a storage area network (SAN), an interconnection of nodes, or manageable entities, provides an example of a network configuration adaptable to a test database. The database 130 stores configuration information representative of the manageable entries in the SAN; a periodic discovery operation traverses the SAN and identifies the manageable entities interconnected in the SAN along with corresponding attributes. The database 130 is a relational database responsive to a database management system (DBMS) 122 for storing tables 132 indicative of the attributes of the manageable entries (stored as columns, or fields, of the manageable entities) and also storing relations 134 indicative of the relationships between the manageable entities.

In the example SAN 100, a set of storage arrays 102-1 . . . 102-5 (102 generally) connect to switches 104-1 . . . 104-3 (104 generally), and are accessible from hosts 106-1 . . . 106-2 (106 generally). The hosts 106-1 . . . 106-2 execute agents 110-1 . . . 110-2 (110 generally). The agents 110 communicate to a server 120 via a network interconnection 112, such as the Internet. The server 120 receives configuration information 124 from the agents 110, and stores the configuration information 124 in the database 130. The database 130 has a set of tables 132-1 . . . 132-3 for storing the configuration information, each having one or more entries, or rows 133 (FIG. 3, below), of fields (columns) 136. The database 130 also identifies the relations 134-1 . . . 134-2 (134 generally) between the tables 132. The relations 134 identify corresponding rows 133 in other tables 132, typically via a key field denoting a matching field value between the related rows 133 (entries).

The disclosed sanitizing of the database 130 is performed by a sanitizing application 127 operable in conjunction with the DBMS 122 for accessing the database 130. In the example configuration, the sanitizing application 127 generates a script 128 based on a scrubbing configuration 150. The scrubbing configuration 150 specifies the tables 132, columns 136 (FIG. 3, below), and operation to change sensitive data with fabricated data, and contains a scrubbing entry, or row, for each column 136 to be scrubbed. The operation may indicate that the data should be overwritten with fabricated, benign data, or that the entry be nullified, or truncated if the value is not needed. The DBMS 122 is responsive to the generated SQL script 128 or other database command sequence 125 for performing the sanitizing operations on the database 130.

Figure 2:
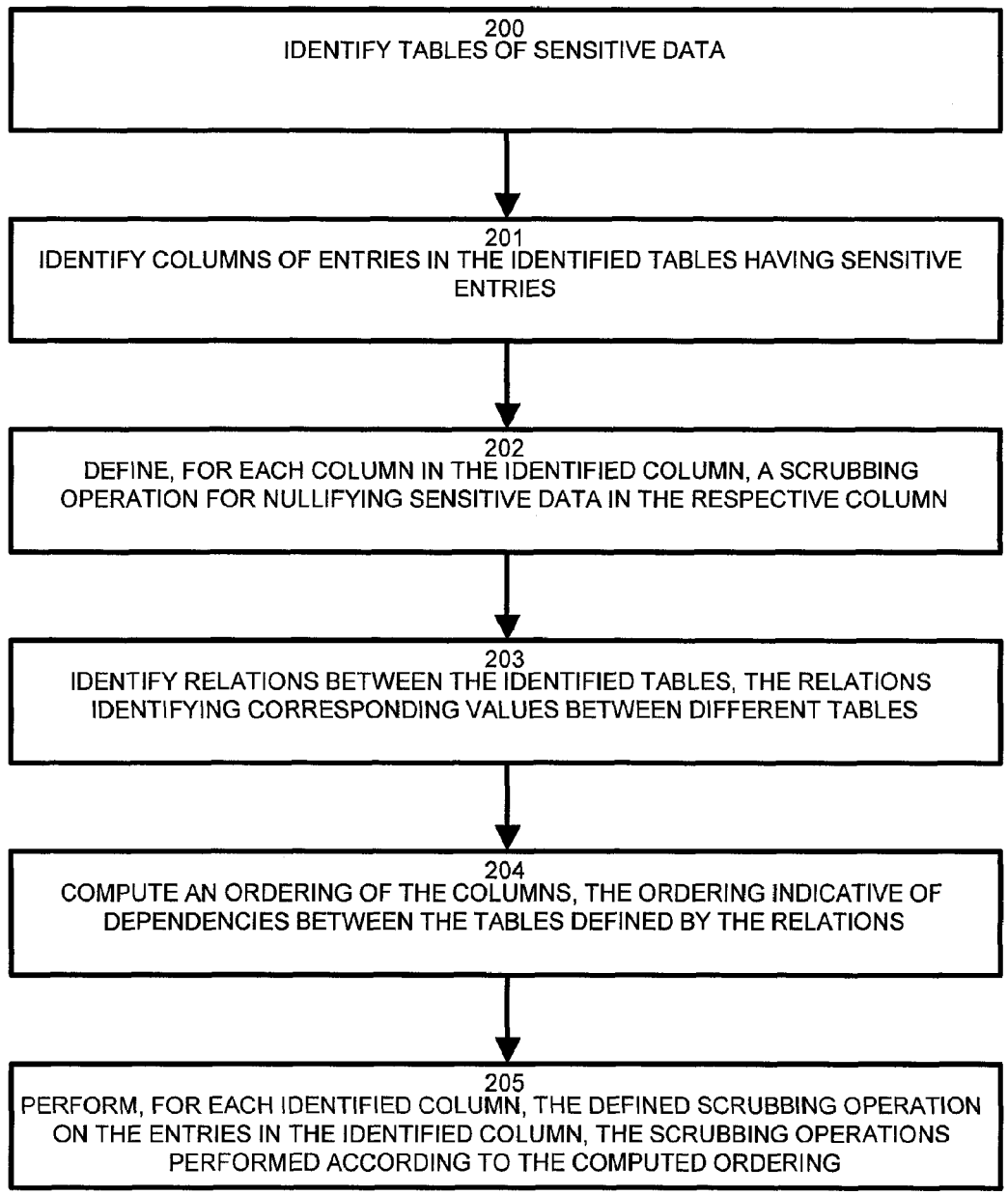
FIG. 2 is a flowchart of removing sensitive data from a database in the environment of FIG. 1.

FIG. 2 is a flowchart of removing sensitive data from a database 130 in the environment of FIG. 1. Referring to FIGS. 1 and 2, the example configuration shows the disclosed method for sanitizing a customer specific database 130 by identifying tables 132 of sensitive data, as depicted at step 200, and identifying, columns 136, or fields of entries in the identified tables 132 having sensitive entries, as shown at step 201. Each field 136 having sensitive data results in a column specific update to remove sensitive data from that field 132 for all entries. In the example arrangement, a tabular form such as a spreadsheet defines the information in the scrubbing configuration 150, shown below in FIG. 4, and results in a SQL script specific to each column 136. Alternate configurations may provide other mechanisms for defining the scrubbing updates.

Accordingly, for each identified column 136 of sensitive data in the identified tables 132, the method defines a scrubbing operation for overwriting sensitive data in the respective column 136, as depicted at step 202, typically by replacing the value with a fabricated (computed) value, discussed further below. A common scrubbing operation is replacement of the sensitive value with a fabricated benign value, however other mechanisms such as simple truncation may be employed. The DBMS 122 in the server 120 identifies relations 134 between the identified tables 132, such that the relations 134 identify corresponding values between different tables 132, as disclosed at step 203. The relations 134 define the types of keys between the tables, such as foreign keys and internal keys, and are employed to compute an ordering of the columns, such that the ordering indicative of dependencies between the tables defined by the relations, as depicted at step 204. The ordering therefore defines a priority to ensure that foreign keys are updated prior to the tables to which they refer. The DBMS 122 then performs, for each identified column, the defined scrubbing operation on the entries 133 in the identified column 136, the scrubbing operations performed according to the computed ordering, as depicted at step 205.

Figure 3:
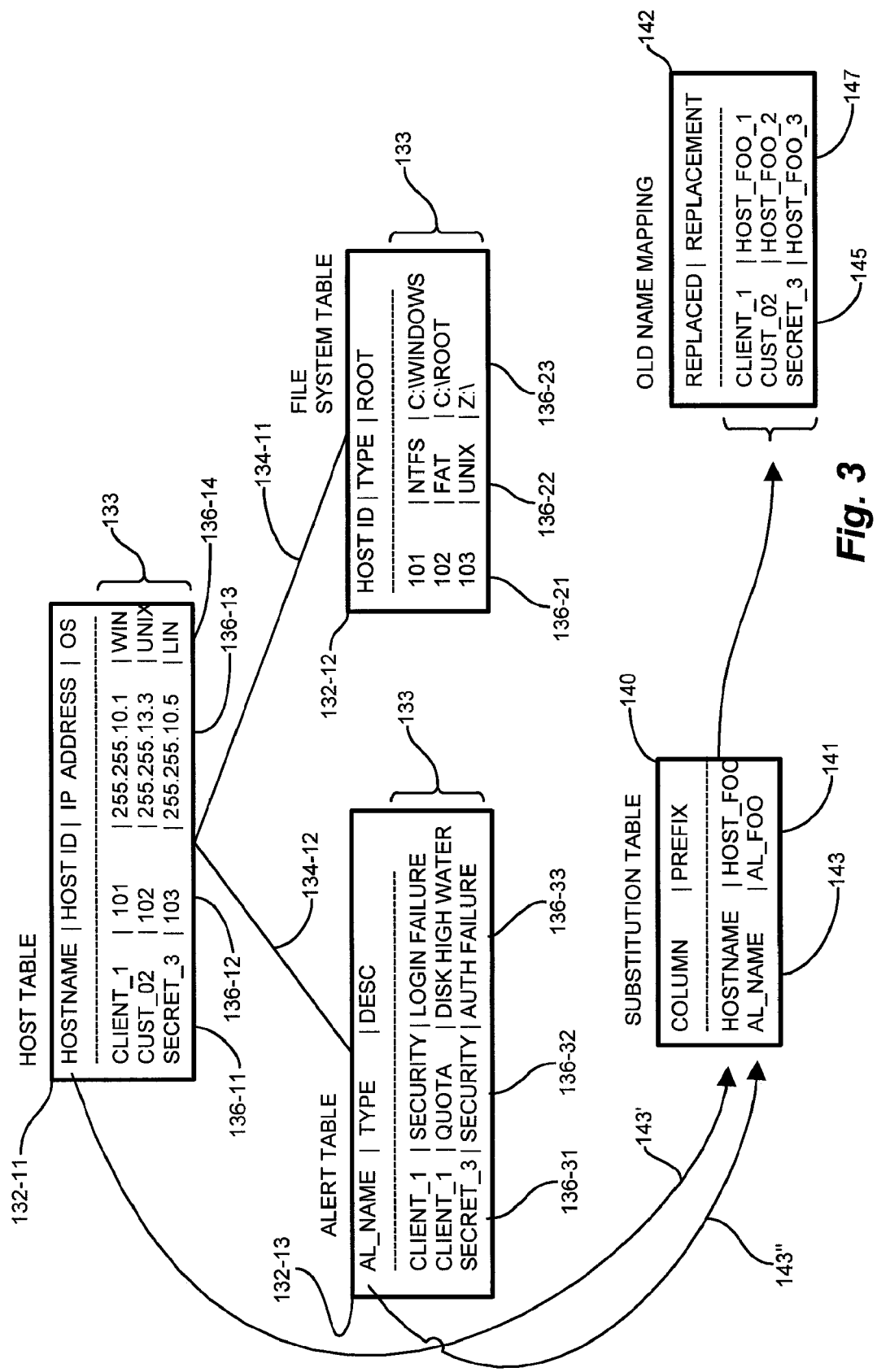
FIG. 3 is a block diagram of processing database entities for removing sensitive data according to the flowchart of FIG. 2
Figure 5:
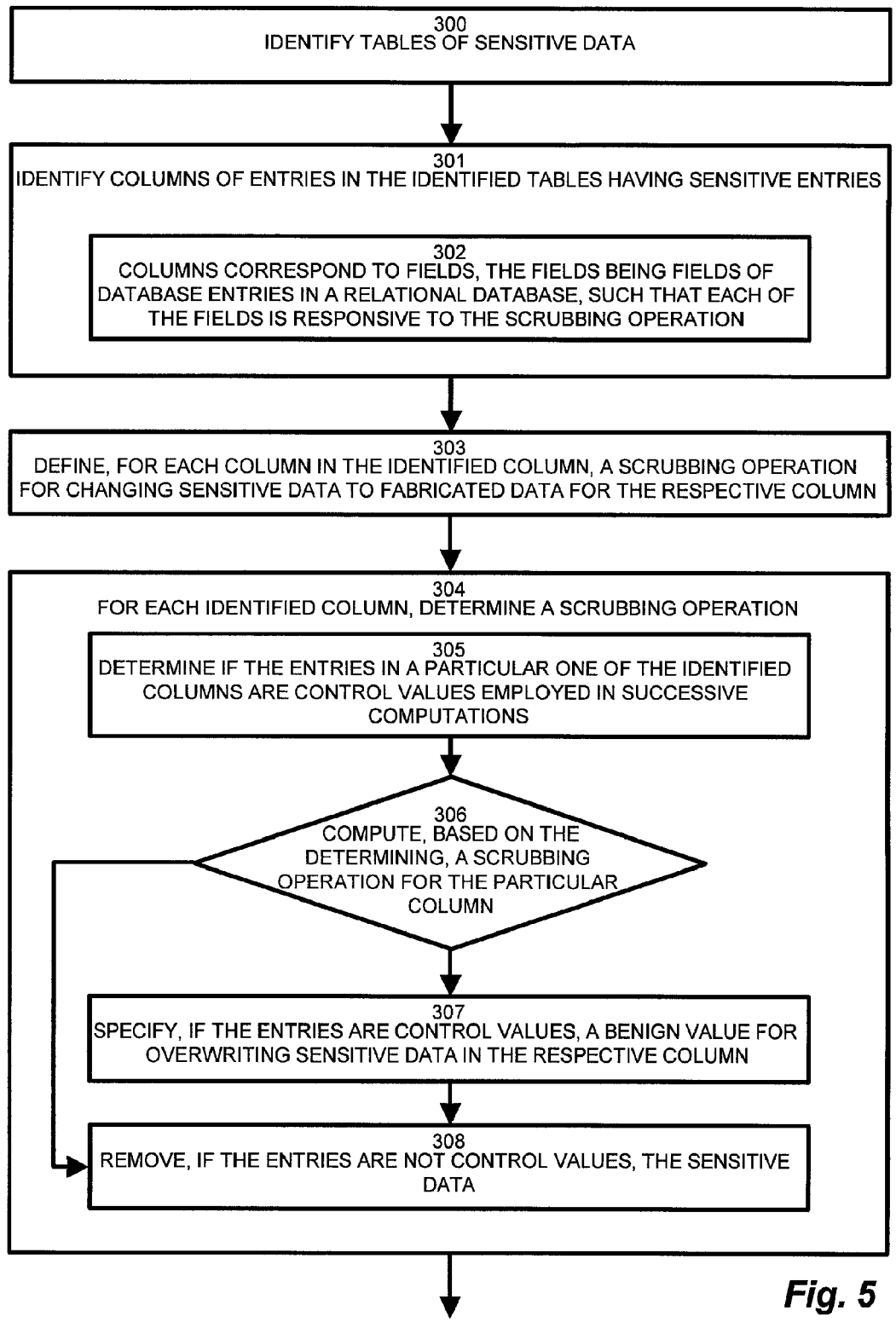
FIGS. 5-8 are a flowchart of employing the table of FIG. 4 for scrubbing the database entities as depicted in FIG. 3.
Figure 6:
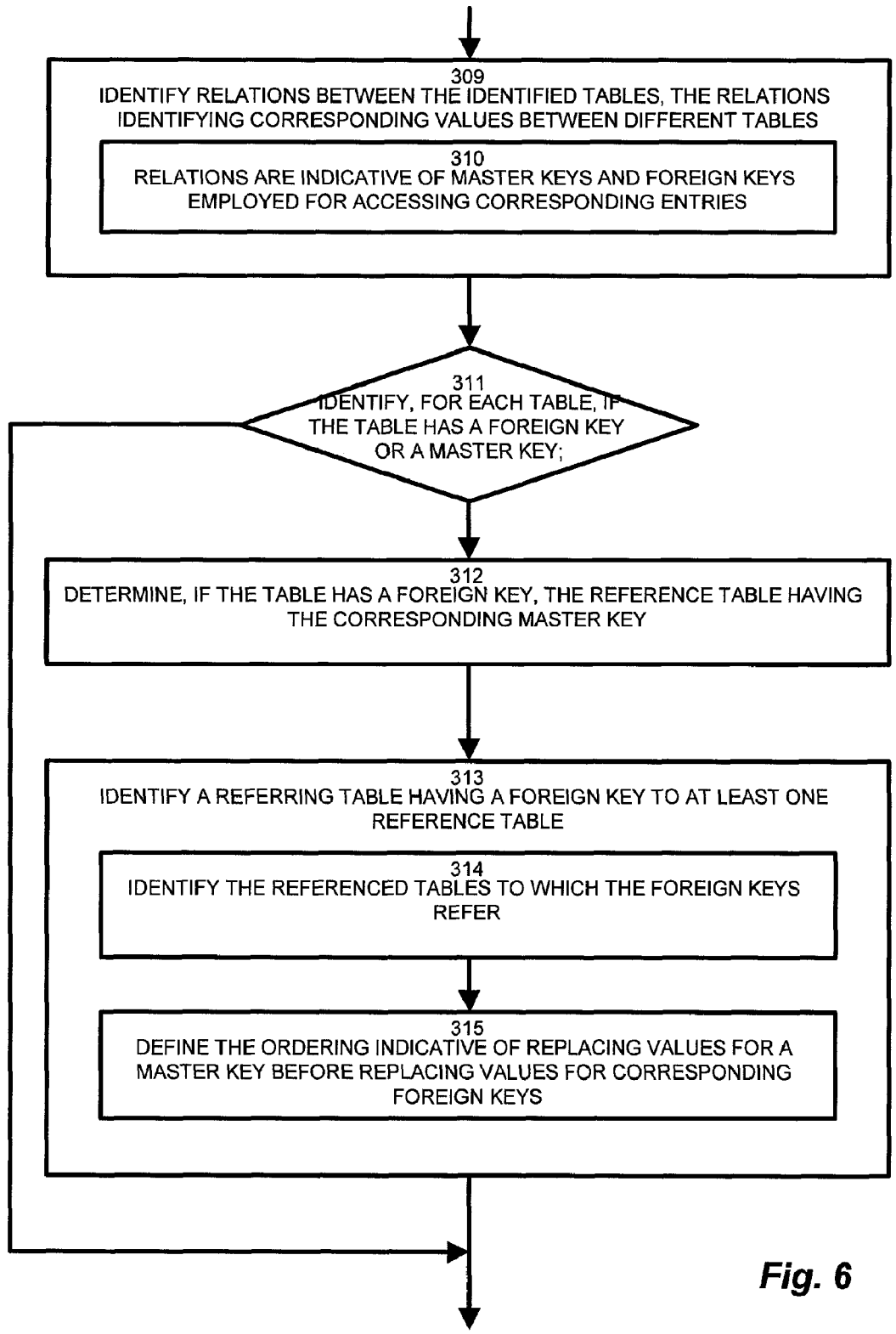
Figure 7:
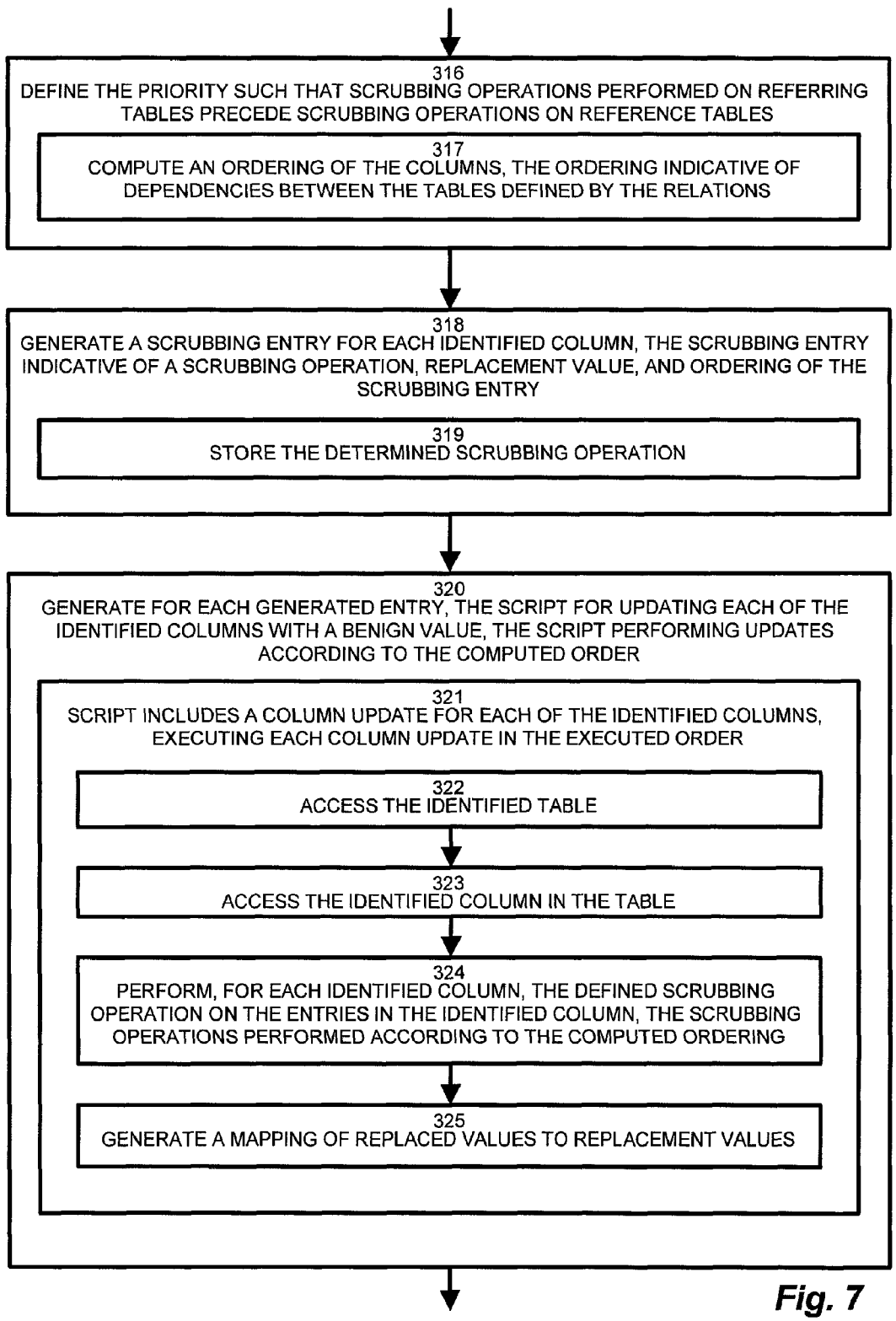
Figure 8:
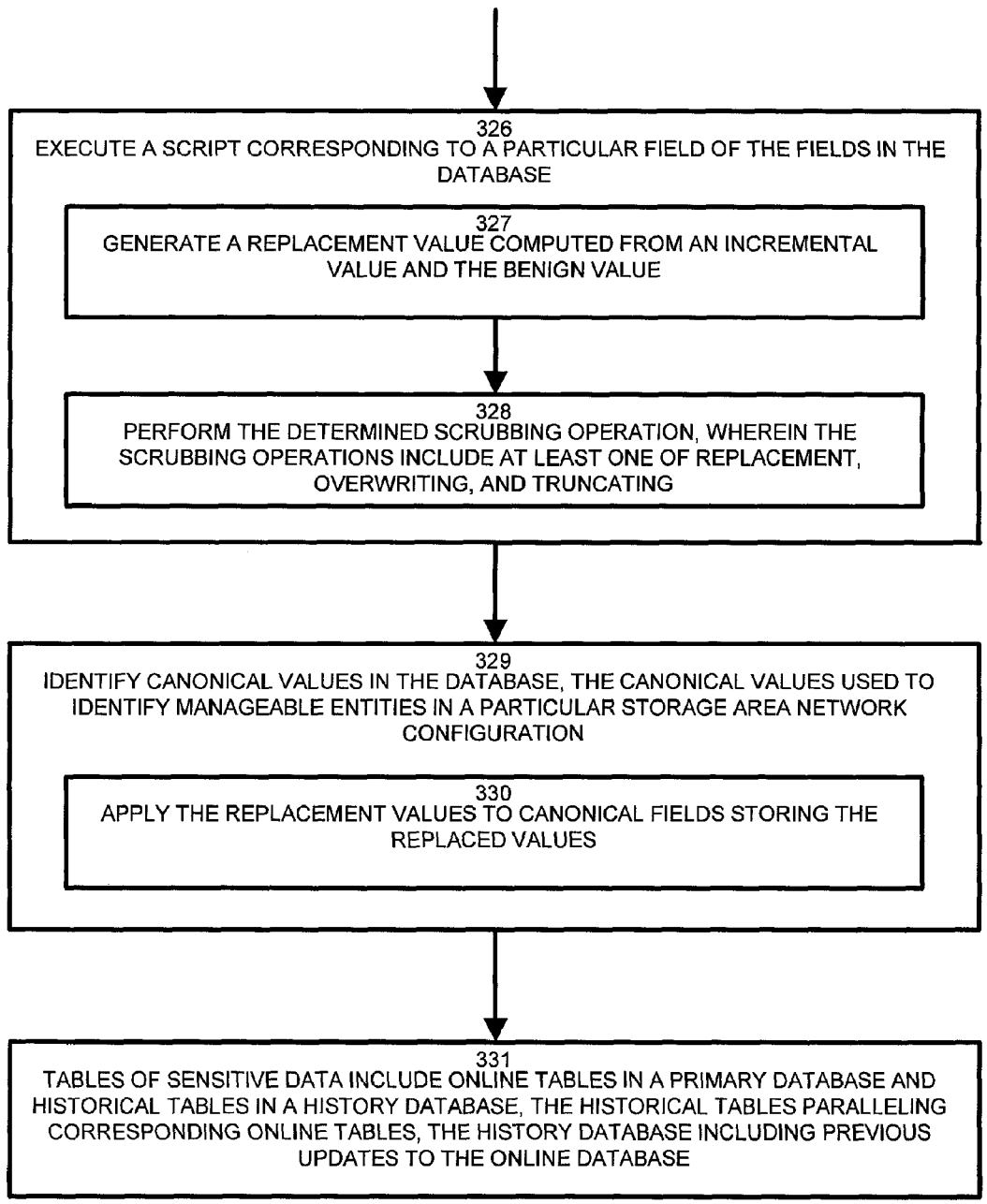

FIG. 3 is a block diagram of processing database entities for removing sensitive data according to the flowchart of FIG. 2. In conventional database sanitization, or scrubbing, techniques, manual substitution of sensitive data with safe, or generic data may disrupt relations 134 between the tables 132 when fields are employed as key values into another table 132. Each table 132 has columns, or fields 136, in arranged in rows, or entries 133. In particular, configurations herein substitute values in key, or referring tables, before scrubbing referred tables into which the values refer. In this manner, the referred tables retain the relations 134 from the referring tables by updating the referred tables with the same corresponding values as the referring table. FIG. 3 depicts this ordering of the relations.

Referring to FIG. 3, the relations 134 denoting the key fields are identified by key fields between the entries. Matching key fields between tables 132 denote relations between records, and may either be via matching of data values, as a so-called foreign key, or by database internal identifiers, or indices, to related entries 133, discussed further below. In the example database 100, a host table 132-11 has a relation 134-11 to a file system table 132-12 and a relation 134-12 to an alert table 132-13. The host table 132-11 includes fields 136 for host name 136-11, host ID 136-12, IP address 136-13 and operating system OS 136-14. Similarly, the file system table 132-12 has fields 136 for host ID 136-21, host type 136-22 and root directory 136-23, and the alert table includes host name 132-31, alert type 136-32 and alert description 136-33.

Host table 132-11 has a relation 134-11 to the file system table 132-12. The relation is defined from the referring host ID field 136-12 to the referred field 136-21, and is an internal database identifier, typically in integer value or index. The host table 132-11 also has a relation 134-12 to the alert table 132-13 via fields host name 136-11 and alert name 136-31 (AL_NAME). Since the host name 136-31 has actual data, rather than a database generated index, it is a foreign key meaning that the actual data values operate as a key field. Since the host name 136-11,136-31 is considered sensitive data, it will be overwritten with generated replacement values. A priority ordering, discussed further below, ensures that the referring field host name 136-11 is replaced before the referred field 136-31 so that referential integrity between the tables 132-11 and 132-13 is maintained.

For each sensitive value, a replacement value overwrites a replaced value of sensitive data. A old name mapping table 142 of replaced values 145 and corresponding replacement values 147 is indexed by a substitution table 144 of fields 143 for which updates were performed. The mapping table 142 of replaced names is employed in successive updates to determine a foreign key value in the replaced value 145 now residing in the replacement value 147.

An old name mapping table 142 correlates replaced values to their benign counterparts, and is indexed from a substitution table 140 that specifies a concatenation base name 141 for each field (column) 143 that requires a sensitive data substitution. The replaced field names 143 are obtained from the respective field names in the table 132-11, 132-13, as shown by arrows 143' and 143" respectively. The replacement name is computed from a concatenation of the base name 142 and a counter increment.

FIG. 4 is a scrubbing configuration 150 depicted as a table employed for generating scripts for performing processing according to FIG. 3. In the example arrangement, each column 136 having sensitive data defines a row entry 154-1 . . . 154-10 (154 generally) in a set of updates 152 arranged in a tabular form in a scrubbing configuration 150, such as in a spreadsheet. The scrubbing configuration 150 in the spreadsheet includes, for each row entry 154, a table name 156-1 indicating the table having sensitive data, a cname 156-2 denoting the field containing the sensitive data, and a prefix 156-3 indicating the replacement name, or string, that will be concatenated with an incremental value to form the replacement name. The spreadsheet also includes a priority field 156-4 specifying the order that the fields are to be updated, and a scrubbing function 156-5 to indicate the operation to occur to remove the sensitive data, such as replacement or truncation.

FIGS. 5-8 are a flowchart of employing the table of FIG. 4 for scrubbing the database entities as depicted in FIG. 3. Referring to FIGS. 3-8, the disclosed method of sanitizing a customer specific database includes, in the example configuration shown, identifying tables of sensitive data, as depicted at step 300, and identifying columns 136 of entries in the identified tables 132 having sensitive entries, as shown at step 301. The columns 136 correspond to fields, in which the fields are fields of database entries 133 in the relational database 130, such that each of the fields 136 is responsive to the scrubbing operation 256-5 for overwriting sensitive data in the field 136, as shown at step 302. As is known in the art, relational databases 130 are expressible as tabular two dimensional tables including rows, or entries 133 of fields, denoted as columns 136. When a field includes sensitive data, the replacement operation, discussed further below, is applied to the entire column 136 to purge all entries 133 of sensitive data for that particular field.

The sanitizing application 127 defines, for each column 136 in the identified columns, a scrubbing operation 156-5 for overwriting sensitive data in the respective column 136, as depicted at step 303. Defining the scrubbing operation may include fabricating a particular benign value 156-3 with which to overwrite the sensitive data. At step 304, for each identified column, the sanitizing application 127 determines a scrubbing operation, and determines if the entries in a particular one of the identified columns 136 are control values employed in successive computations, as shown at step 305. A check is performed for computing, based on the determining, a scrubbing operation for the particular column, as shown at step 306. Based on the check, the sanitizing application specifies, if the entries are control values, a benign value for overwriting sensitive data in the respective column, as shown at step 307, or truncates, if the entries 136 are not control values, the sensitive data, as depicted at step 308. Alternate scrubbing operations may be employed, such as blanking the field, encrypting the field, or any suitable field modification. Therefore, a typical scrubbing operation is replacement of the sensitive data with a generated benign value, however truncation and nullification may also be employed, particularly if the data in the field is not employed for subsequent control.

The method identifies relations 134 between the identified tables 132, such that the relations 134 identify corresponding values between different tables 132, as shown at step 309. The relations 134 are indicative of master keys and foreign keys employed for accessing corresponding entries 133, as depicted at step 310. The foreign key relations employ the actual table values as keys (foreign keys) in to another (referred) table 132. When table values referring to other tables as foreign key values, the corresponding key values in the referred table need to be changed to the same value as the foreign key in the referring table 132. Accordingly, a check is performed, for each table 132, to determine if the table has a foreign key or a master key, as depicted at step 311.

The method determines, if the table 132 has a foreign key, the reference table 132 having the corresponding master key, as depicted at step 312. Since the master key points to, or refers to, the same foreign key value in the referred table, the replacement values for each are the same. The resulting computed ordering 156-4 is based on identification of a referring table 132-11 having a foreign key 136-11 to at least one reference table 132-13, as shown at step 313. This includes identifying the referenced tables to which the foreign keys refer, as shown at step 314, and defining the ordering to be indicative of replacing values for a master key before replacing values for corresponding foreign keys, as depicted at step 315. The resulting ordering defines the priority such that scrubbing operations performed on referring tables precede scrubbing operations on reference tables, as disclosed at step 315. In the example arrangement, the scrubbing configuration 150 employs the priority 156-4 for computing an ordering of the columns 136, such that the ordering is indicative of dependencies between the tables defined by the relations 134, as depicted at step 317. Thus, the replacement values are applied to referring tables before the referenced tables to which the foreign keys refer.

Having computed the pertinent values for the scrubbing configuration 150, the method generates a scrubbing entry 154 for each identified column 136, such that the scrubbing entry 154 is indicative of a scrubbing operation, replacement value, and ordering of the scrubbing entry, as shown at step 318. In the example arrangement, a spreadsheet is employed for storing the scrubbing entry and the determined scrubbing operation, as shown at step 319, however alternate arrangements, such as another database table, may be employed for storing the scrubbing configuration 150.

The sanitizing application 127 receives the scrubbing configuration 150, and generates, for each generated entry 154 in the scrubbing configuration, a SQL script 128 for performing the defined scrubbing operation 156-5. Executing the generated script updates each of the identified columns 136 with a benign value, such that the scripts 128 perform updates according to the computed order, as shown at step 320. The scripts 128 may be a single set of SQL instructions, or a series of individual scripts 128, as shown at table I, however collectively the script 128 includes a column update for each of the identified columns, executing each column update in the executed order, as disclosed at step 321. The script 128 therefore accesses the identified table 132, as shown at step 322, and accesses the identified column 136 in the table 132, as depicted at step 323. The script contains SQL commands 125 to perform, for each identified column 136, the defined scrubbing operation 156-5 on the entries 133 in each identified column 136, in which the scrubbing operations 156-5 are performed according to the computed ordering. 156-4, as disclosed at step 324. In the example arrangement, executing of the script 128 invokes the DBMS 122 for issuing commands 125 to the database 130 according to the script 128, however alternate arrangements for accessing the sensitive data may be performed. After accessing the tables 132, the sanitizing application 127 generates a mapping of replaced values to replacement values, as depicted at step 325. The mapping of values may take the form of a database mapping table 142, as shown in the example, or other suitable association. The mapping of values is employed below to identify the replacement values corresponding to particular "real" values for entities such as node names. The entries in the old name mapping table 142 are indexed from a substitution table 140 of prefixes employed for generating the benign names.

TABLE I

| SQL for base table: |
|---|
| sql_stmt:=' Update '\|\| REC_TABLELIST.TNAME\|\|<br>' set '\|\| REC_COLUMN.CNAME\|\| |

TABLE I-continued

SQL for base table:

'='||''''||REC_COLUMN.prefix||''''||'||rownum'||
' where '||REC_COLUMN.CNAME||' is not null ';

After generation of the scripts 128, the DBMS 122 performs the scrubbing operation by executing the scripts 128 corresponding to each particular field (column 136) of the fields in the database 130, as depicted at step 326. Executing the script 128 generates a replacement value computed from an incremental value and the benign value 141, as shown at step 327. The DBMS 122 then performs the determined scrubbing operation 156-5, in which the scrubbing operations include at least one of replacement, overwriting, and truncating, as depicted at step 328 (Note that some scrubbing operations, such as truncation, may not require a generated replacement value).

Following the scrubbing operation, the DBMS 122 identifies canonical values in the database, such that the canonical values are used to identify the manageable entities in a particular storage area network configuration, as depicted at step 329. This may be performed incrementally, however is typically performed after the replacement values have been written. The canonical values represent "real world" labels of items such as manageable entities in the SAN 100. Accordingly, the DBMS employs the old name mapping 142 for applying the replacement values to canonical fields storing the replaced values, as disclosed at step 330.

Further updates include a scenario involving a parallel historical database, in which the tables of sensitive data include online tables in a primary database and historical tables in a history database, the historical tables paralleling corresponding online tables. In such a scenario, the history database including previous updates to the online database and the scripts 128 further perform updates to the historical database, as shown at step 331.

Those skilled in the art should readily appreciate that the programs and methods for sanitizing a database as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example as in an electronic network such as the Internet or telephone modem lines. Such delivery may be in the form of a computer program product having a computer readable storage medium operable to store computer program logic embodied in computer program code encoded thereon, for example. The operations and methods may be implemented in a software executable object or as a set of instructions embedded in an addressable memory element. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for sanitizing a database has been particularly shown and described with references to embodiments thereof, it will be understood by those skilled in the art that various changes in form and details may be made therein without departing from the scope of the invention encompassed by the appended claims.

What is claimed is:

1. A method of sanitizing a database comprising:
   identifying tables of sensitive data;
   identifying columns of entries in the identified tables having sensitive entries;
   defining, for each column in the identified columns, a scrubbing operation for overwriting sensitive data in the respective column;
   identifying relations between the identified tables, the relations identifying corresponding values between different tables, wherein the relations are indicative of master keys and foreign keys employed for accessing corresponding entries:
   computing an ordering of the columns, the ordering indicative of dependencies between the tables defined by the relations;
   generating a scrubbing entry, the scrubbing entry indicative of a scrubbing operation, replacement value, and an ordering of the scrubbing entry for each identified column;
   generating, for each generated scrubbing entry, a script for performing the defined scrubbing operation; and
   performing, for each identified column, the defined scrubbing operation on the entries in the identified column according to the computed ordering of the columns,
   wherein the computed ordering of the columns comprises:
   identifying a referring table having a foreign key to at least one reference table: identifying the referenced tables to which the foreign keys refer: and defining the priority such that scrubbing operations performed on referring tables precede scrubbing operations on reference tables.

2. The method of claim 1 wherein performing the scrubbing operation includes executing a script corresponding to a particular field of the entries in the database, further comprising:
   generating the script, the script for updating each of the identified columns with a benign value, the script performing updates according to the computed order.

3. The method of claim 2 wherein the script includes a column update for each of the identified columns, executing each column update in the computed order, each executed script performing:
   accessing the identified table;
   accessing the identified column in the table; and
   generating a replacement value computed from an incremental value and the benign value.

4. The method of claim 3 further comprising:
   identifying canonical values in the database, the canonical values identifying manageable entities in a particular storage area network configuration;
   generating a mapping of replaced values to replacement values; and
   applying the replacement values to canonical fields storing the replaced values.

5. The method of claim 1 wherein defining the scrubbing operation further comprises:
   determining if the entries in a particular one of the identified columns are control values employed in successive computations;
   computing, based on the determining, a scrubbing operation for the particular column, the scrubbing operation including:

specifying, if the entries are control values, a benign value for overwriting sensitive data in the respective column, and truncating, if the entries are not control values, the sensitive data.

6. The method of claim 1 further comprising:

for each identified column, determining a scrubbing operation;

storing the determined scrubbing operation; and performing the determined scrubbing operation, wherein the scrubbing operations include at least one of replacement, overwriting, and truncating.

7. The method of claim 6 further comprising:

identifying, for each table, if the table has a foreign key or a master key;

determining, if the table has a foreign key, the reference table having the corresponding master key;

defining the ordering indicative of replacing values for a master key before replacing values for corresponding foreign keys.

8. The method of claim 1 wherein the columns correspond to fields, the fields being fields of database entries in a relational database, such that each of the fields is responsive to the scrubbing operation for overwriting sensitive data in the field.

9. The method of claim 8 wherein the tables of sensitive data include online tables in a primary database and historical tables in a history database, the historical tables paralleling corresponding online tables, the history database including previous updates to the online database.

10. A computing device for sanitizing a customer specific database comprising:

memory;

a processor;

a scrubbing configuration file that identifies tables of sensitive data, the scrubbing configuration file further identifying columns of entries in the identified tables having sensitive data, and defining, in the scrubbing configuration, for each column in the identified columns, a scrubbing operation for overwriting sensitive data in the respective column;

a sanitizing application, the sanitizing application accessing the scrubbing configuration file to identify relations between the identified tables, the relations identifying corresponding values between different tables and wherein the relations are indicative of master keys and foreign keys employed for accessing corresponding entries, the sanitizing application further operable to compute an ordering of the columns, the ordering indicative of dependencies between the tables defined by the relations, generate a scrubbing entry, the scrubbing entry indicative of a scrubbing operation, replacement value, and an ordering of the scrubbing entry for each identified column, and generate, for each generated scrubbing entry, a script for performing the defined scrubbing operation; and an interface to a database management system, the interface allowing for the sanitizing application to perform, for each identified column, the defined scrubbing operation on the entries in the identified column according to the computed ordering of the columns, wherein the computed ordering of the columns comprises:

a referring table having a foreign key to at least one reference table;

referenced tables to which the foreign keys refer; and defining the priority such that scrubbing operations performed on referring tables precede scrubbing operations on reference tables.

11. The computing device of claim 10 wherein the interface further comprises a script generator, the script generator for generating a script for performing the scrubbing operation corresponding to each particular column, the script generator further operable for generating the script for updating each of the identified columns with a benign value, the script performing updates according to the computed order.

12. The computing device of claim 11, wherein the script includes a column update for each of the identified columns, executing each column update in the executed order, each executed script performing:

accessing the identified table;

accessing the identified column in the table; and generating a replacement value computed from an incremental value and the benign value.

13. The computing device of claim 10 wherein the sanitizing application is further operable to generate, from the scrubbing configuration, a scrubbing entry for each identified column, the scrubbing entry indicative of a scrubbing operation, replacement value, and ordering of the scrubbing entry; and generate, for each generated entry, a SQL script for performing the defined scrubbing operation.

14. The computing device of claim 13 wherein the sanitizing application is further to:

determine if the entries in a particular one of the identified columns are control value employed in successive computations;

compute, based on the determining, a scrubbing operation for the particular column, the scrubbing operation including:

specifying, if the entries are control values, a benign value for overwriting sensitive data in the respective column, and truncating, if the entries are not control values, the sensitive data.

15. A computer program product having computer program code on a non-transitory computer storage medium including a set of encoded instructions that, when executed by a processor, cause a computer to perform a method of genericizing a customer specific database, the method comprising:

identifying tables of sensitive data;

identifying columns of entries in the identified tables having sensitive entries;

specifying, for each column in the identified columns of entries, a benign value for overwriting sensitive data in the respective column;

identifying relations between the identified tables, the relations identifying corresponding values between different tables, wherein the relations are indicative of master keys and foreign keys employed for accessing corresponding entries;

computing an ordering of the columns, the ordering indicative of dependencies between the tables defined by the relations;

generating a scrubbing entry the scrubbing entry indicative of a scrubbing operation, replacement value, and an ordering of the scrubbing entry for each identified column;

generating, for each generated scrubbing entry, a script for performing the generated scrubbing operation; and executing the script for applying the benign value to each identified column such that sensitive data is overwritten, the scripts executed in an order that preserves the identified relations;

wherein the computed ordering of the columns comprises:
identifying a referring table having a foreign key to at least one reference table;
identifying the referenced tables to which the foreign keys refer;
and defining the priority such that scrubbing operations performed on referring tables precede scrubbing operations on reference tables.

\* \* \* \* \*